United States Patent
Dounis

(10) Patent No.: US 11,568,152 B2
(45) Date of Patent: Jan. 31, 2023

(54) AUTONOMOUS LEARNING OF ENTITY VALUES IN ARTIFICIAL INTELLIGENCE CONVERSATIONAL SYSTEMS

(71) Applicant: Citrix Systems, Inc., Ft. Lauderdale, FL (US)

(72) Inventor: Lampros Dounis, Patras (GR)

(\*) Notice: Subject to any disclaimer, the term of this patent is extended or adjusted under 35 U.S.C. 154(b) by 193 days.

(21) Appl. No.: 16/930,471

(22) Filed: Jul. 16, 2020

(65) Prior Publication Data
US 2021/0397796 A1  Dec. 23, 2021

Related U.S. Application Data

(63) Continuation of application No. PCT/GR2020/000030, filed on Jun. 18, 2020.

(51) Int. Cl.
| | |
|---|---|
| *G06F 40/35* | (2020.01) |
| *G06N 20/00* | (2019.01) |
| *G06F 40/253* | (2020.01) |
| *G06F 40/247* | (2020.01) |
| *G06F 40/232* | (2020.01) |
| *G06F 40/289* | (2020.01) |

(Continued)

(52) U.S. Cl.
CPC ............ *G06F 40/35* (2020.01); *G06F 40/232* (2020.01); *G06F 40/247* (2020.01); *G06F 40/253* (2020.01); *G06F 40/279* (2020.01); *G06F 40/289* (2020.01); *G06F 40/30* (2020.01); *G06N 5/04* (2013.01); *G06N 20/00* (2019.01); *H04L 67/01* (2022.05); *G06F 40/205* (2020.01)

(58) Field of Classification Search
CPC ...... G06F 40/35; G06F 40/232; G06F 40/247; G06F 40/253; G06F 40/289; G06F 40/205; G06F 40/279; G06F 40/30; G06N 5/04; G06N 20/00; H04L 67/42

USPC .......................................................... 704/9

See application file for complete search history.

(56) References Cited

U.S. PATENT DOCUMENTS

| 11,201,955 B1 * | 12/2021 | Sachdeva | ................ H04L 41/40 |
| 11,270,185 B1 * | 3/2022 | Ouyang | ................ G06N 3/004 |

(Continued)

FOREIGN PATENT DOCUMENTS

| EP | 3073422 A1 | 9/2016 |
| EP | 3588328 A1 | 1/2020 |

OTHER PUBLICATIONS

Developer.amazon.com. 2020. [online] Available at: <https://developer.amazon.com/en-US/docs/alexa/custom-skills/handle-requests-sent-by-alexa.html#handle-intents> [Accessed Jul. 15, 2020].

(Continued)

*Primary Examiner* — Edwin S Leland, III

(57) ABSTRACT

A computer system configured for autonomous learning of entity values is provided. The computer system includes a memory that stores associations between entities and fields of response data. The computer system also includes a processor configured to receive a request to process an intent; generate a request to fulfill the intent; transmit the request to a fulfillment service; receive, from the fulfillment service, response data specifying values of the fields; identify the values of the fields within the response data; identify the entities via the associations using the fields; store, within the memory, the values of the fields as values of the entities; and retrain a natural language processor using the values of the entities.

20 Claims, 7 Drawing Sheets

(51) Int. Cl.
  *G06N 5/04* (2006.01)
  *G06F 40/279* (2020.01)
  *G06F 40/30* (2020.01)
  *H04L 67/01* (2022.01)
  *G06F 40/205* (2020.01)

(56) References Cited

U.S. PATENT DOCUMENTS

| | | | | |
|---|---|---|---|---|
| 11,361,242 | B2* | 6/2022 | Green | G06N 3/08 |
| 11,461,679 | B2* | 10/2022 | Damodaran | G06N 5/04 |
| 2007/0027694 | A1* | 2/2007 | Bushey | G10L 15/063 |
| | | | | 704/275 |
| 2011/0301955 | A1* | 12/2011 | Byrne | G06F 40/247 |
| | | | | 704/E15.005 |
| 2014/0379615 | A1* | 12/2014 | Brigham | G06N 3/126 |
| | | | | 706/11 |
| 2014/0380285 | A1* | 12/2014 | Gabel | G06N 5/022 |
| | | | | 717/139 |
| 2017/0116982 | A1* | 4/2017 | Gelfenbeyn | G10L 15/08 |
| 2018/0032503 | A1* | 2/2018 | Swart | G06F 16/9535 |
| 2018/0268319 | A1* | 9/2018 | Guo | G06N 5/04 |
| 2019/0012390 | A1* | 1/2019 | Nishant | G06N 3/006 |
| 2019/0080687 | A1* | 3/2019 | Nagamatsu | G10L 15/22 |
| 2019/0108832 | A1* | 4/2019 | Tomar | G10L 15/16 |
| 2019/0130904 | A1* | 5/2019 | Homma | G10L 15/18 |
| 2019/0236205 | A1* | 8/2019 | Jia | G06F 16/3329 |
| 2019/0294678 | A1* | 9/2019 | Sapugay | G06F 40/211 |
| 2019/0311000 | A1* | 10/2019 | Ginsberg | G06F 40/35 |
| 2019/0348029 | A1* | 11/2019 | Bhaya | G10L 15/30 |
| 2019/0361978 | A1* | 11/2019 | Ray | G06F 40/205 |
| 2020/0050662 | A1* | 2/2020 | Bhat | G06F 40/295 |
| 2020/0057806 | A1* | 2/2020 | Bhutani | G06F 40/205 |
| 2021/0064643 | A1* | 3/2021 | Folland | G06F 40/35 |
| 2021/0173825 | A1* | 6/2021 | Lu | G06F 16/2365 |
| 2021/0352097 | A1* | 11/2021 | Vlahovic | H04L 63/0884 |
| 2021/0397796 | A1* | 12/2021 | Dounis | G06F 40/247 |
| 2022/0179892 | A1* | 6/2022 | Kermode | G06N 5/022 |
| 2022/0313162 | A1* | 10/2022 | Xu | A61B 5/0205 |

OTHER PUBLICATIONS

International Search Report and Written Opinion for Application No. PCT/GR2020/000030, dated Mar. 15, 2021, 11 pages.
Examination Report No. 1 for Australian Application No. 2020356799, dated Nov. 29, 2021, 8 pages.
Examination Report No. 2 for Australian Application No. 2020356799, dated Nov. 19, 2022, 4 pages.

* cited by examiner

AUTONOMOUS LEARNING OF ENTITY VALUES IN ARTIFICIAL INTELLIGENCE CONVERSATIONAL SYSTEMS

CROSS-REFERENCE TO RELATED APPLICATIONS

This application claims the benefit under 35 U.S.C. § 120 as a continuation of PCT application no. PCT/GR2020/000030, titled "AUTONOMOUS LEARNING OF ENTITY VALUES IN ARTIFICIAL INTELLIGENCE CONVERSATIONAL SYSTEMS," filed on Jun. 18, 2020, which designates the United States. The aforementioned application is hereby incorporated herein by reference in its entirety.

BACKGROUND

Artificial intelligence (AI) conversational systems, such as chatbots and virtual assistants, are gaining in popularity and use. Virtual assistants, such as the Citrix Assistant commercially available from Citrix Systems, Inc. of Ft. Lauderdale, Fla., are software agents that interact with a user to execute tasks on behalf of the user. Users can interact with virtual assistants to accomplish daily tasks and improve their productivity.

Virtual assistants receive, interpret, and respond to user utterances (e.g., human language communications). In doing so, virtual assistants can answer questions, control devices, playback media, and execute other useful processes. Virtual assistants use Natural Language Processing (NLP) techniques to extract, from a user utterance, an intent and one or more entities that modify and/or increase the specificity of the intent. When needed, virtual assistants fulfill the intent by interoperating with external services (e.g. micro-apps, 3rd party services, and the like). In this way, virtual assistants are able to create dialogs with the user to act as a bridge between the user and the external services. The dialogs can include audio and textual responses, multi-media presentations, hyperlinks, and other forms of content.

SUMMARY

In one example, a computer system is provided. The computer system includes a memory, a network interface, and at least one processor coupled to the memory and the network interface. The memory stores one or more associations between one or more entities and one or more fields of response data. The at least one processor is coupled to the memory and the network interface. The at least one processor is configured to receive a request to process an intent; generate a request to fulfill the intent; transmit, via the network interface, the request to a fulfillment service; receive, from the fulfillment service via the network interface, response data specifying one or more values of the one or more fields; identify the one or more values of the one or more fields within the response data received from the fulfillment service; identify the one or more entities via the one or more associations using the one or more fields; store, within the memory, the one or more values of the one or more fields as one or more values of the one or more entities; and retrain a natural language processor using the one or more values of the one or more entities.

At least some examples of the computer system can include one or more of the following features. The at least one processor can be further configured to receive, from a thesaurus service via the network interface, a response specifying thesaurus data associated with the one or more values of the one or more fields, the thesaurus data comprising one or more of a synonym, a verb, and a plural form of the one or more values of the one or more fields; and store, within the memory, the thesaurus data. The at least one processor can be further configured to determine, for at least one entity of the one or more entities, whether the system is configured to import thesaurus data regarding the entity. The at least one processor can be further configured to store the one or more values of the one or more fields within dictionary data accessible by a spellchecker. The at least one processor can be further configured to receive an utterance from a user in human language expressing the intent; identify, via execution of the natural language processor, the utterance as expressing the intent; generate a response to the intent; and render the response to the user in the human language. In the computer system, the intent can be a first intent and the at least one processor can be further configured to: receive a request to process a second intent; generate a request to fulfill the second intent, the request to fulfill the second intent including at least one parameter value equal to at least value of one or more values of the one or more fields; transmit, via the network interface, the request to the fulfillment service; and receive, via the network interface, a response to the second intent, the response to the second intent including response data derived from the parameter value. The at least one processor can be further configured to determine, for at least one entity of the one or more entities, whether the system is configured to auto-discover values of the entity.

In another example, a method of autonomously learning new entity values is provided. The method can be executed by a conversational system comprising a memory storing one or more associations between one or more entities and one or more fields of response data. The method comprises receiving a request to process an intent; generating a request to fulfill the intent; transmitting, via a network interface, the request to a fulfillment service; receiving, from the fulfillment service via the network interface, response data specifying one or more values of the one or more fields; identifying the one or more values of the one or more fields within the response data received from the fulfillment service; identifying the one or more entities via the one or more associations using the one or more fields; storing, within the memory, the one or more values of the one or more fields as one or more values of the one or more entities; and retraining a natural language processor using the one or more values of the one or more entities.

At least some examples of the method can include one or more of the following features. The method can further comprise receiving, from a thesaurus service via the network interface, a response specifying thesaurus data associated with the one or more values of the one or more fields, the thesaurus data comprising one or more of a synonym, a verb, and a plural form of the one or more values of the one or more fields; and storing, within the memory, the thesaurus data. The method can further comprise determining, for at least one entity of the one or more entities, whether the conversational system is configured to import thesaurus data regarding the entity. The method can further comprise storing the one or more values of the one or more fields within dictionary data accessible by a spellchecker. The method can further comprise receiving an utterance from a user in human language expressing the intent; identifying, via execution of the natural language processor, the utterance as expressing the intent; generating a response to the intent; and rendering the response to the user in the human language. In the method, the intent can be a first intent. The method can further comprise receiving a request to process a second intent; generating a request to fulfill the second intent, the request to fulfill the second intent including at least one parameter value equal to at least one value of the one or more values of the one or more fields; transmitting, via the network interface, the request to the fulfillment service; and receiving, via the network interface, a response to the second intent, the response to the second intent including response data derived from the parameter value. The method can further comprise determining, for at least one entity of the one or more entities, whether the conversational system is configured to auto-discover values of the entity.

In another example, a non-transitory computer readable medium storing executable sequences of instructions to implement an autonomous learning process is provided. within a conversational system comprising a memory storing one or more associations between one or more entities and one or more fields of response data, the sequences of instructions comprising instructions to: receive a request to process an intent; generate a request to fulfill the intent; transmit, via a network interface, the request to a fulfillment service; receive, from the fulfillment service via the network interface, response data specifying one or more values of the one or more fields; identify the one or more values of the one or more fields within the response data received from the fulfillment service; identify the one or more entities via the one or more associations using the one or more fields; store, within the memory, the one or more values of the one or more fields as one or more values of the one or more entities; and retrain a natural language processor using the one or more values of the one or more entities.

At least some examples of the non-transitory computer readable medium can include one or more of the following features. The sequences of instructions can further comprise instructions to receive, from a thesaurus service via the network interface, a response specifying thesaurus data associated with the one or more values of the one or more fields, the thesaurus data comprising one or more of a synonym, a verb, and a plural form of the one or more values of the one or more fields; and store, within the memory, the thesaurus data. The sequences of instructions can further comprise instructions to determine, for at least one entity of the one or more entities, whether the conversational system is configured to import thesaurus data regarding the entity. The sequences of instructions can further comprise instructions to store the one or more values of the one or more fields within dictionary data accessible by a spellchecker. The intent can be a first intent, and the sequences of instructions further comprise instructions to receive a request to process a second intent; generate a request to fulfill the second intent including at least one parameter value equal to at least one value of the one or more values of the one or more fields; transmit, via the network interface, the request to the fulfillment service; and receive, via the network interface, a response to the second intent including response data derived from the parameter value. The sequences of instructions can further comprise instructions to determine, for at least one entity of the one or more entities, whether the conversational system is configured to auto-discover values of the entity.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
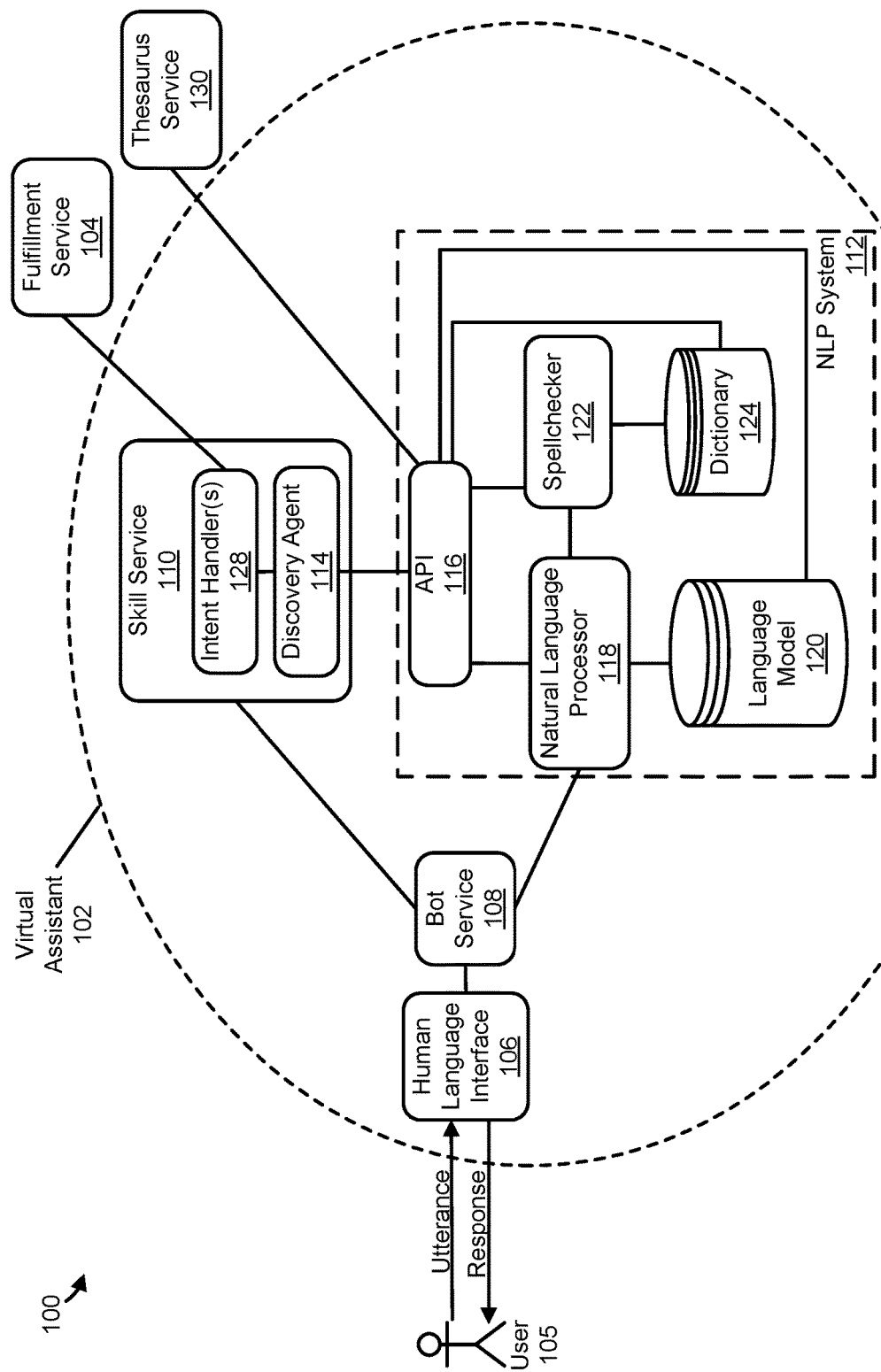
FIG. 1 is a block diagram depicting a virtual assistant system in accordance with one or more examples described herein.

As summarized above, various examples described herein are directed to systems and processes that enable a virtual assistant to identify new values for entities associated with intents processed by the virtual assistant. These systems and processes extend the processing of the intents to utilize these new entity values. This extensibility enables the systems and processes to autonomously adapt to changes in user and conversation agent vocabulary over time, making the systems and processes flexible and robust to such changes. The systems and processes described herein overcome practical limitations present in other virtual assistance technologies, which are inflexible with regard to changes in user and conversation agent vocabulary and incapable of autonomous handling of such changes. The inflexibility present in these other virtual assistance technologies stems, at least in part, from their reliance on users for initial setup and configuration.

Virtual assistants utilize NLP systems to classify utterances as expressing corresponding intents. Each intent represents an aim or objective of an utterance. In some implementations, training an NLP system to classify utterances into intents requires labeled training data. This labeled training data can include records that associate intents with utterances. For instance, each record of the training data can include a first field that stores an utterance and a second field that stores an associated intent (e.g., a string value) that labels the utterance as being an instance of the intent. Table 1 lists a sample of training data in accordance with these implementations.

TABLE 1

| Utterance | Label |
|---|---|
| "find my tickets" | "lookup" |
| "find my major tickets" | "lookup" |
| "find tickets assigned to Billy Taylor" | "lookup" |
| "show Citrix tickets" | "lookup" |

The training data included in Table 1 is pertinent to, for example, an NLP system that is being trained to process utterances related to technical support. In this context, the NLP system is likely to encounter, for example, utterances that request a listing of service tickets having at least one identified commonality. As such, the training data included in Table 1 associates several utterances that reflect this intent with a "lookup" label, which is also the value of a particular intent (i.e., the lookup intent). The lookup intent can be, in turn, associated with a intent handler configured to receive, process, and respond to lookup intents by generating a list of service tickets having an identified commonality, which the virtual assistant can then provide to the user.

Virtual assistants also utilize NLP systems to extract, from an utterance, entity values associated with an intent. In a general sense, intents are fulfilled by operations that refer to entities. For example, to fulfill an intent that requests a listing of service tickets having at least one identified commonality, the fulfiller must be provided a value for the commonality. In this example, the commonality is an entity and the value is an entity value. To illustrate further with reference to Table 1, the utterance "find my tickets" provides a value (i.e., "my") for the commonality (i.e., tickets assigned to an identified agent). The utterance "find my major tickets" provides two values (i.e., "my" and "major") for two commonalities, (i.e., the agent of the tickets and the priority of the tickets). As such, in some implementations, entities are input parameters of an intent handler associated with an intent and entity values are parameter values that affect processing executed by the intent handler.

Further, in some implementations, training an NLP system to extract entity values from utterances requires labeled training data. This labeled training data can include records that associate entities with one or more words (i.e. entity values) included in utterances. For example, each record of the training data can include a first field that stores an utterance, a second field that stores an associated intent (e.g., a string value) that labels the utterance as being an instance of the intent, a third field that stores identifies an entity value (e.g., one or more words) within the utterance, and a fourth field that stores an associated entity (e.g., a string value) that labels the entity value as being an instance of the entity. Table 2 lists a sample of training data in accordance with these implementations.

TABLE 2

| Utterance | Label | Entity Value | Label |
|---|---|---|---|
| "find my tickets" | "lookup" | "my" | "agent" |
| "find my major tickets" | "lookup" | "my" | "agent" |
| "find my major tickets" | "lookup" | "major" | "priority" |
| "find tickets assigned to Billy Taylor" | "lookup" | "Billy Taylor" | "agent" |
| "show Citrix tickets" | "Lookup" | "Citrix" | "requestor" |

The training data included in Table 2 is pertinent to, for example, the NLP system that is being trained to process utterances related to technical support. In this context, the NLP system is likely to encounter, for example, utterances that specify the lookup intent. As such, the training data included in Table 2 associates several utterances with the lookup intent, and further associates, within the context of the utterances, several entity values with entities useful to fulfill the lookup intent.

In some implementations, the NLP system stores entities and entity values within training data that is organized according to one or more relationships between the entities and entity values. For example, where an entity is associate with multiple entity values, the NLP system can store the entity and its associated multiple entity values with a structure that relates the entity with each entity value and any synonyms of the entity value. To illustrate further with reference to Table 2, the requestor entity and multiple entity values associated with the requestor entity can be stored in a data structure such as the following.

```
entity: {
    name: "requestor"
    values: [
        {
            value: "Citrix"
            synonyms: ["Citrix", "CTXS", "Citrix Systems Inc."]
        }
        {
            value: "Google"
            synonyms: ["Google", "googl", "Alphabet Inc."]
        }
    ]
}
```

In certain implementations, a training process (e.g., a backpropagation process, a sub-gradient descent process, etc.) accesses and processes the training data described above to generate a model (e.g., an artificial neural network, support vector machine, etc.) trained to classify utterances into intents and/or to extract entity values from the utterances.

The training data described above originates from one or more sources. Some NLP systems receive training data from a user (e.g., a machine language (ML) engineer) who is skilled in generating training data for specific NLP system applications. Additionally or alternatively, some NLP systems (e.g., Google Dialogflow and Azure LUIS) provide preconfigured training data that can be used as-is or supplemented with additional training data by a ML engineer and/or an end-user. This preconfigured training data can enable trained NLP systems to extract, for example, dates, times, and names of persons from utterances. An NLP system that is fully-trained with a vocabulary specific to a knowledge domain enables a virtual assistant that the NLP system supports to interact with a user fluently within the knowledge domain.

Despite the benefits that virtual assistants can provide, challenges regarding configuration and use of virtual assistants remain. For example, communications regarding specialized knowledge domains typically include specialized language (i.e., jargon). However, adding jargon needlessly to NLP training data can decrease the efficacy of a virtual assistant in some situations. Additionally, some entities (e.g., companies, people, etc.) may require a large volume of entity values to be fully populated within the training data. This requirement can make sourcing appropriate training data a non-trivial effort. Moreover, a vocabulary used to communicate within a knowledge domain tends to shift over time.

To overcome the above limitations, and to overcome other limitations that will be apparent upon reading and understanding the present specification, some examples described herein include systems and processes that enable a virtual assistant to autonomously adjust its language model to match the current state of a knowledge domain in which the virtual assistant operates. The teachings of the present disclosure can find meaningful application with a wide variety of virtual assistants including, for example, the Alexa virtual assistant available from Amazon.com, Inc. of Seattle, Wash.; the Google Assistant virtual assistant available from Google Inc. of Mountain View, Calif.; and SLACKBOT® bots available from Slack Technologies, Inc. of San Francisco, Calif.

In some examples, the systems and processes described herein implement one or more application programming interfaces (APIs) through which an NLP can receive newly discovered entity values. In these examples, the APIs store newly discovered entity values within operational data and/or training data used to train the NLP system and initiate retraining of the NLP system. In this way, the systems and processes described herein enable the NLP system to properly process and respond to utterances containing the new entity values.

Further, in some examples, the systems and processes described herein implement a discovery agent within a skill or fulfillment service. In these examples, the discovery agent is configured to analyze responses to skill fulfillment requests and identify new entity values stored therein. The discovery agent is also configured to notify an NLP system of the new entity values using the API described above (e.g., where the discovery agent identifies new entity values within a fulfillment response).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Autonomous Learning Conversational System

In some examples, a conversational system (e.g., a virtual assistant) is configured to autonomously learn new entity values through the course of normal operations. FIG. 1 illustrates a logical architecture of a conversational system 100 in accordance with these examples.

As shown in FIG. 1, conversational system 100 includes a virtual assistant 102, a fulfillment service 104, and a thesaurus service 130. The virtual assistant 102 includes a human language interface 106, a bot service 108, a skill service 110, and a NLP system 112. The skill service 110 includes one or more intent handler(s) 128 and a discovery agent 114. Any one of the intent handler(s) 128 may be referred to herein generically as an intent handler 128. The NLP system 112 includes an API 116, a natural language processor 118, a language model data store 120, a spell-checker 122, and a dictionary data store 124. FIG. 1 also illustrates lines of communication between these computer-implemented processes. Details regarding these communications are provided below, but it should be noted that the depicted lines of communication can include inter-process communication (e.g., where two or more of the computer-implemented processes illustrated in FIG. 1 reside within the same execution environment) and network-based communication (e.g., where two or more of the processes reside in different execution environments coupled to one another by a computer network). In some examples, lines of communication between computer-implemented processes can include hypertext transfer protocol (HTTP) based communications.

In FIG. 1, the interface 106 is configured to interact with a user 105 by receiving utterances and rendering responses. The interface 106 can include, for example, one or more input/output devices (e.g., microphones, keyboards, cameras, etc.) and a software stack configured to drive operation of the input/output devices. The interface 106 also includes higher level processes that can detect the utterances made by the user 105 and render the responses to the user 105. The utterances and responses can be communicated in any medium accessible to a human, with perhaps the most prominent media being sound, sight, and/or touch. As such, utterances made by the user 105 via vocalization, typing, gesturing, and the like. Responses can be rendered by speakers, displays, and/or haptic devices. Audio utterances can begin with an wake word, such as a name of a virtual assistant, followed by a request. Audio responses can be generated by a text-to-speech program implemented by the interface 106.

Continuing FIG. 1, the bot service 108 is configured to interact with the user 105 to manage conversations with the user 105. As such, the bot service 108 can receive utterances from the interface 106 and transmit responses to be rendered by the interface 106 to the user 105. The bot service 108 is also configured to interoperate with the NLP system 112 and the skill service 110 to generate the responses prior to transmission. For instance, in some examples, the bot service 108 can transmit utterances received from the interface 106 to the NLP system 112 for processing and can receive intents and entity values associated with the intents from the NLP system 112. Further the bot service 108 can transmit the intents and entity values to the skill service 110 for fulfillment and can receive responses from the skill service 110. By interacting with the user 105, the bot service 108 can execute a variety of useful processes, such as user identify and authentication, answering user questions, and executing programmatic actions.

Continuing the example of FIG. 1, the NLP system 112 is configured to receive utterances from the bot service 108, process the utterances to identify intents and values of entities associated with the intents, and return the identified intents and entities to the bot service 108. Within the NLP system 112, the natural language processor 118 can be configured to transform utterances into a standardized format. Utterances within the standardized format can be further processed by other parts of the virtual assistant 102. For instance, in some examples, the natural language processor 118 transforms verbal utterances into a textual representation that can be further processed by the spellchecker 122. In these and other examples, the spellchecker 122 is configured to normalize the standardized utterance to ensure consistent values that span standardized utterances. For example, the spellchecker 122 can enforce consistent spellings of words and thereby correct misspellings that may be present in utterances. The spellchecker 122 can be particularly useful where an utterance is received from the user 105 within the standardized format (e.g., an utterance received as a text message, email, etc., where the standardized format is text) and the utterance contains misspellings. The spellchecker 122 can be further configured to return normalized utterances to the natural language processor 118. In some examples, the natural language processor 118 can be further configured to identify intents and values of entities associated with the intents as specified within the normalized utterances. In these examples, the natural language processor 118 returns the identified intents and entity values to the bot service 108. Further details regarding the operation of the natural language processor 118 and the spellchecker 122 are articulated further below with reference to FIG. 2.

In some examples, the NLP system 112 identifies intents and entity values using machine learning processes. In these examples, the language model data store 120 is configured to store training data useful to train and retrain the natural language processor 118 to classify utterances as intents and to extract entity values from the utterances. In some examples, the language model data store 120 is also configured to store parameters of the language model applied by the natural language processor 118. These parameters can include, for example, kernel functions; layer, link and node architecture; weights; and other parameters of an artificial neural network, although the examples disclosed herein are not limited to artificial neural networks as other machine learning and rules-based natural language processes can be used. Also as shown in FIG. 1, the dictionary data store 124 is configured to store dictionary records with correct spellings of words for use by the spellchecker 122 during operation. The dictionary data store 124 can include preconfigured dictionary data as well as one or more dictionary data that has been customized by a user to augment the preconfigured dictionary data. In some examples, the data stores 120 and 124 are configured to store the training data and dictionary data within one or more relational database tables, although this is not a requirement.

Continuing the example of FIG. 1, the skill service 110 is configured to receive intents and entity values from the bot service 108, to fulfill the intents by executing the intent handler(s) 128 associated with the intents, and to return responses generated by the intent handler(s) 128 to the bot service 108 for rendering to the user 105. In some instances, an intent handler 128 can fulfill intents locally, but fulfillment often requires an intent handler 128 to interoperate with an external service (e.g., the fulfillment service 104). The fulfillment service 104 is configured to interoperate with the intent handler(s) 128 to execute a programmatic action requested by the user 105 via an utterance. The programmatic action executed by the fulfillment service 104 can include retrieval and return of information requested via the utterances and/or generation of new information specified by the utterance. For instance, in an example directed to technical support, the fulfillment service 104 can retrieve and return information regarding open tickets associated with the user 105 and/or create a new ticket for the user 105.

Continuing the example of FIG. 1, the discovery agent 114 is configured to interoperate with the API 116 to pass entity values to the API 116 for potential storage in and reference by the NLP system 112. The discovery agent 114 can, for example, parse communications received from the intent handler 128, extract entity values specified therein, and pass extracted entity values to the API 116 via one or more API calls. In some examples, the discovery agent 114 is further configured to restrict the entity values passed to the API 116 to only newly discovered entity values. The API 116 is, in turn, configured to receive the entity values, execute one more processes to store new entity values in the data stores 120 and 124, and to initiate retraining the natural language processor 118. In some examples, the API 116 is an HTTP-based API although this is not a requirement. In certain examples, the API 116 can supplement new entity values with synonyms and other data retrieved from the thesaurus service 130, which is an external service that exposes an API to enable retrieval of thesaurus data. Examples of processes that the discovery agent 114 and the API 116 are configured to execute are described further below with reference to FIGS. 2-4.

It should be noted that, in some examples, the API 116 is implemented as two distinct APIs. In these examples, one of the APIs 116 is exposed by the natural language processor 118 and the other is exposed by the spellchecker 122. Further, in these examples, the API exposed by the natural language processor 118 is configured to communicate with the thesaurus service 130 and executes the learning process 300 described further below with reference to FIG. 3. Also, in these examples, the API exposed by the spellchecker 122 is configured to execute the learning process 400 described further below with reference to FIG. 4.

The computer-implemented processes illustrated in FIG. 1 are configured to interoperate with one another to collectively execute autonomous learning processes while the virtual assistant 102 operates in a production environment. These processes achieve skill fulfillment by receiving utterances from the user 105, processing the utterances to identify intents articulated within the utterances, fulfilling the intents, and rendering responses reflective of the fulfillments to the user 105. These processes achieve autonomous learning by discovering, during skill fulfillment, new entity values; storing new records in the data stores 120 and 124; and scheduling retraining of the natural language processor 118, thereby adapting the virtual assistant 102 to properly handle the new entity values. Examples of skill fulfillment with autonomous learning processes are described further below with reference to FIGS. 2-4.

FIG. 2 is a sequence diagram that illustrates one example of a successfully executed process 200 that implements skill fulfillment with autonomous learning. As shown in FIG. 2, the process 200 includes interoperations between the computer-implemented processes illustrated in FIG. 1 that collectively fulfill intents while discovering new entity values to achieve autonomous learning.

The process 200 starts with a human language interface of a virtual assistant (e.g., the human language interface 106 of the virtual assistant 102 of FIG. 1) receiving an utterance 202 from a user (e.g., the user 105 of FIG. 1). For instance, in one example, the human language interface receives the utterance 202 in the form of audio data digitized from an audio signal acquired by a microphone of a computing device. The human language interface passes the utterance 202 to a bot service (e.g., the bot service 108 of FIG. 1) for subsequent processing. The bot service generates a parse request message 204 that includes the utterance 202 and transmits the parse request 204 to a natural language processor (e.g., the natural language processor 118 of FIG. 1).

Continuing the process 200, the natural language processor receives the parse request 204, retrieves the utterance 202 from the parse request 204, and executes natural language processing to convert the utterance 202 into a standardized form (e.g., a textual representation of the audio data). The natural language processor then generates and transmits, to a spellchecker (e.g., the spellchecker 122 of FIG. 1), a normalization request message 206 that includes the standardized form of the utterance 202. The spellchecker receives the normalization request 206 and generates a normalized form of the utterance 202. In some examples, to generate the normalized form, the spellchecker accesses a dictionary data store (e.g., the dictionary data store 124 of FIG. 1) to identify normalized spellings for all of the words included in the standardized form of the utterance 202. The spellchecker replaces any non-normalized spellings with normalized spellings. The spellchecker transmits, to the natural language processor 118, a normalization response message 208 that includes the normalized form of the utterance 202 (e.g., a textual representation of the audio data in which all words are have a normalized spelling).

Continuing the process 200, the natural language processor receives the normalization response 208, retrieves the normalized form of the utterance 202, classifies the utterance 202 as a particular intent using the normalized form, and extracts one or more entity values associated with the particular intent from the normalized form. In some examples, the natural language processor classifies the utterance 202 and extracts the one or more entity values by execution of one or more machine learning processes trained to identify intents and to extract one or more entity values germane to the intents. Examples of natural language processors capable of such classification and extraction activities include Dialogflow and LUIS. The intents can be, for example, intents serviceable by a skill service (e.g., the skill service 110). The natural language processor generates and transmits, to the bot service, a parse response message 210. This parse response 210 includes the intent and the one or more entity values, along with one or more metrics that indicate one or more levels of confidence that the intent and one or more entity values are correct. For instance, in an example directed to technical support, the natural language processor can classify the utterance 202 as articulating a lookup intent. The natural language processor can further extract, from the utterance 202, values for a ticket-priority entity associated with the lookup intent. Examples of these entity values can include "minor", "major", "high", "low", "critical", and the like.

Continuing the process 200, the bot service receives the parse response 210 and extracts the intent, the one or more entity values, and the one or more confidence metrics. The bot service determines whether the one or more confidence metrics are sufficient to warrant further processing (e.g., by comparing the one or more confidence metrics to one or more predefined threshold values). Where the bot service determines that one or more confidence metrics do not warrant further processing (e.g., by determining that the one or more confidence metrics do not transgress the one or more threshold values), the bot service notifies the user, via the human language interface, of the virtual assistant's inability to further process the utterance 202. Where the bot service determines that one or more confidence metrics warrant further processing (e.g., by determining that the one or more confidence metrics transgress the one or more threshold values), the bot service identifies a skill service registered to fulfill the intent (e.g., the skill service 110), generates a skill service request message 212, and transmits the skill service request 212 to the skill service. In some examples, to identify the skill service, the bot service accesses a cross-reference stored in memory that associates intents with skill services, finds the intent within the cross-reference, and identifies the skill service through its association with the intent in the cross-reference. The skill service request includes the intent and the one or more entity values.

Continuing the process 200, the skill service receives the skill service request 212 and retrieves the intent and any entity values specified therein. The skill service identifies an intent handler (e.g. an intent handler 128 of FIG. 1) associated with, and configured to fulfill, the intent. For instance, in some examples, the skill service accesses a cross-reference stored in memory that associates intents with intent handlers, finds the intent within the cross-reference, and identifies the intent handler through its association with the intent in the cross-reference. The skill service fulfills the intent by invoking the identified intent handler via a handler request 214. Where the skill service request 212 includes entity values associated with the intent, the skill service passes the entity values to the intent handler within the handler request 214. For instance, in an example directed toward technical support, the skill service request 212 can specify the lookup intent and an entity value that identifies the user 105 as a common agent assigned to service tickets to be looked up. In this example, the skill service identifies a handler registered to handle the lookup intent, executes the handler, and passes the entity value that identifies the user to the handler via the handler request 214.

Continuing the process 200, during processing of the intent, the intent handler can execute a wide variety of programmatic operations. To promote scalability, the intent handler can offload processing by generating a fulfillment request 216 and transmitting the fulfillment request 216 to a fulfillment service (e.g., the fulfillment service 104 of FIG. 1). The fulfillment request 216 can include any parameter helpful to fulfillment service execution. As such, the parameters included in the fulfillment request 216 can specify input to the fulfillment service and/or request output from fulfillment service. Further, the parameters can include entity values passed to the intent handler by the skill service via the handler request 214. In these examples, the intent handler identifies parameters of the intent handler that are associated with the entity values and passes the entity values to intent handler as the identified parameters. For instance, in some examples, the intent handler accesses a cross-reference stored in memory that associates entities with parameters, finds the entities within the cross-reference, and identifies the parameters through their association with the entities.

In an example where the intent is directed to maintenance of the user's schedule, the intent handler may generate and transmit a skill fulfillment request 216 that includes parameters that specify an identifier of the user and a change to the user's schedule. These parameters can be entity values passed to the intent handler by the skill service via the handler request 214. In a different example where the intent is a lookup intent, the intent handler may generate and transmit a skill fulfillment request 216 that includes a parameter that specifies an identifier of the user. This parameter can be an entity value passed to the intent handler by the skill service via the handler request 214. More specifically, in at least one example, the fulfillment request 216 transmitted by the intent handler for a lookup intent can be an HTTP request that includes a uniform resource identifier (URI) such as "/tickets?name=<agent>", where <agent> is the identifier of the user as specified by the entity value. In another example, the fulfillment request 216 transmitted by the intent handler for the lookup intent can be an HTTP request that include a URI such as "/tickets?priority=major&requestor=Citrix". In this example, the intent handler identifies that the entity values "major" and "Citrix" are respectively associated with the "priority" and "requestor" parameters of the lookup intent handler and passed those entity values to the lookup intent handler as parameter values.

Continuing the process 200, the fulfillment service receives the fulfillment request 216, generates a fulfillment response 218, and transmits the fulfillment response 218 to the intent handler. The fulfillment response 218 can include, for example, response data generated or received by the fulfillment service during its processing of the fulfillment request 216. For instance, this response data can include an indicator of whether the fulfillment service successfully processed the fulfillment request 216. The response data can also include and one or more response values requested by the intent handler via the fulfillment request 216. In some examples, the response values stored in name-value pairs. In these examples, the name is an identifier of a response field and the value is a response value associated with the response field.

For instance, in an example directed to maintenance of the user's schedule, the fulfillment service can receive the skill fulfillment request 216, retrieve an identifier of the user and schedule change data, and interoperate with an external calendar service to update the user's schedule in accordance with the schedule change data. Further, in this example, the fulfillment service can generate and transmit a fulfillment response 218 with response data that includes an indicator that the user's schedule was not successfully updated and response values that identify a conflicting event with the user's schedule. The response values can be stored, for example, as "conflict:{'2010/06/03', '23:45', 'Meeting with Natalie'}", where "conflict" is the response field (here an object name) and "{'2010/06/03', '23:45','Meeting with Natalie'}" is the response value.

In an example directed to technical support, the fulfillment service can search for and identify any tickets associated with an agent (e.g., the user) specified in the fulfillment request 216. The fulfillment service can also generate a fulfillment response 218 that includes response data and transmit the fulfillment response 218 to the intent handler. The response data can include an indicator that the query was successful and response values that describe tickets identified by the fulfillment service. The fulfillment response 218 can take the form of an HTTP response. For instance, the fulfillment service can generate and transmit an HTTP response that includes a JavaScript Object Notation (JSON) object having the following structure.

```
Tickets : list of Ticket Objects
Ticket Object :
{
   id:<number>
   agent:<string>
   description:<string>
   priority:<string>
   requestor:<string>
}
```

In this example, the name-value pairs of response data are of the following form "id:<number>", "agent:<string>", "description:<string>", "priority:<string>", and "requeston<string>".

In another example, the fulfillment service can search for and identify any tickets associated with a requestor (e.g., "Citrix") specified in the fulfillment request 216. The fulfillment service can also generate a fulfillment response 218 that includes response data and transmit the fulfillment response 218 to the intent handler. The response data can include an indicator that the query was successful and response values that describe tickets identified by the fulfillment service. This fulfillment response 218 can take the form of an HTTP response. For instance, the fulfillment service can generate and transmit an HTTP response that includes the following list of JSON ticket objects.

```
{
   tickets: [
      {
         id: 1,
         agent: "Unassigned",
         description: "bug in patent tool",
         priority: Major,
         requestor: "Citrix"
      },
      {
         id: 2,
         agent: "Unassigned",
         description: "slow responses",
         priority: Very Minor,
         requestor: "Citrix"
      }
   ]
}
```

In this example, the name-value pairs of response data include "ticket_1_id:1", "ticket_1_agent:/Unassigned'", "ticket_1_description:'bug in patent tool'", "ticket_1_priority:'Major'", "ticket_1_requestor:'Citrix'", "ticket_2_id:2", "ticket_2_agent:/Unassigned'", "ticket_2_description:'slow responses'", "ticket_2_priority: 'Very Minor'", "ticket_2_requestor:'Citrix'".

Continuing the process 200, the intent handler receives the fulfillment response 218 and processes the fulfillment response 218 to generate both a handler response 220 and a discovery request 222. During this processing, the intent handler parses the fulfillment response 218 and extracts the response data from the fulfillment response 218. The intent handler generates the handler response 220 based on the content of the response data. For instance, in some examples, where the response data indicates that the fulfillment service was unable to execute an programmatic action and/or return information requested by the intent handler in the fulfillment request 216, the intent handler generates a handler response 220 that indicates that the intent was not successfully fulfilled. However, in these examples, where the response data indicates that the fulfillment service successfully executed the programmatic action and/or returned requested information, the intent handler generates a handler response 220 that indicates the action was successful and/or incorporates the requested information into the handler response 220. Upon successful generation of the handler response 220, the intent handler passes the handler response to the skill service for eventual rendering to the user.

In some examples, to generate the discovery request 222, the intent handler identifies response fields within the response data that are associated with entities in the language model. In some examples, to identify the association between a response field and an entity, the intent handler accesses a cross-reference stored in memory that associates response fields with entities; finds, within the cross reference, the response field within the cross-reference, and identifies the entity through its association with the response field in the cross-reference. Alternatively or additionally, the fulfillment response 218 may utilize response fields that match entities of the language model. In either case, the intent handler stores, within the discovery request 222, an association between each entity identified as being associated with a response field and a response value associated with the response field. In some examples, the intent handler stores these associations as name-value pairs. Upon successful generation of the discovery request 222, the intent handler transmits the discovery request 222 to a discovery agent (e.g., the discovery agent 114 of FIG. 1).

In an example directed to technical support, a portion of the cross-reference that associates response fields with entities is listed in Table 3.

TABLE 3

| Response Field | Entity |
| --- | --- |
| ticket_1_priority | priority |
| ticket_2_priority | priority |
| ticket_1_requestor | requestor |
| ticket_2_requestor | requestor |

In this example, where the fulfillment response 218 includes the list of JSON ticket objects described above, the intent handler stores associations in the discovery request 222 that include the following name-value pairs: "priority:[Major, Very Minor]" and "requestor:'Citrix'".

Figure 2A:
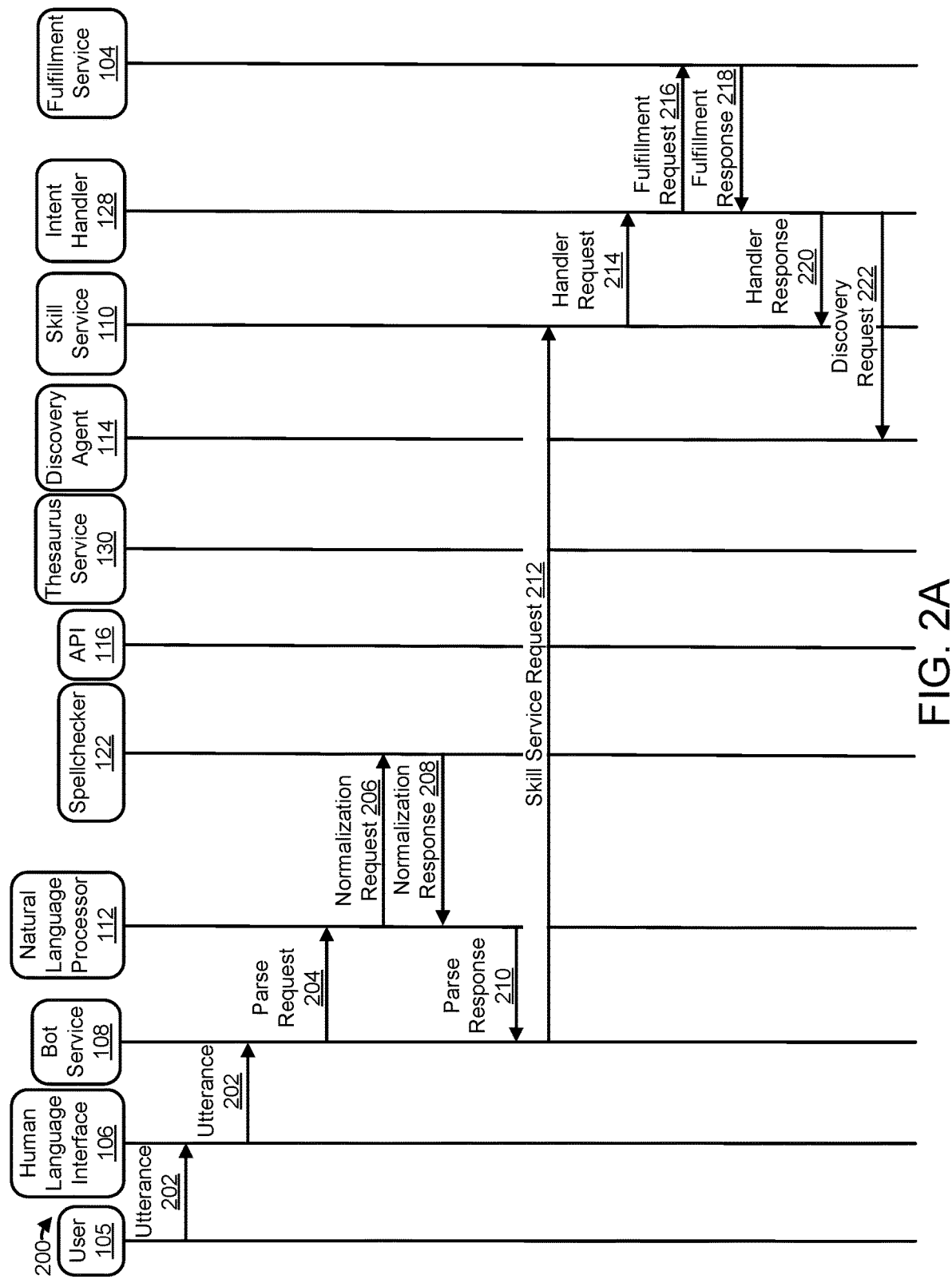
FIGS. 2A and 2B are sequence diagram illustrating an entity learning process in accordance with one or more examples described herein.
Figure 2B:
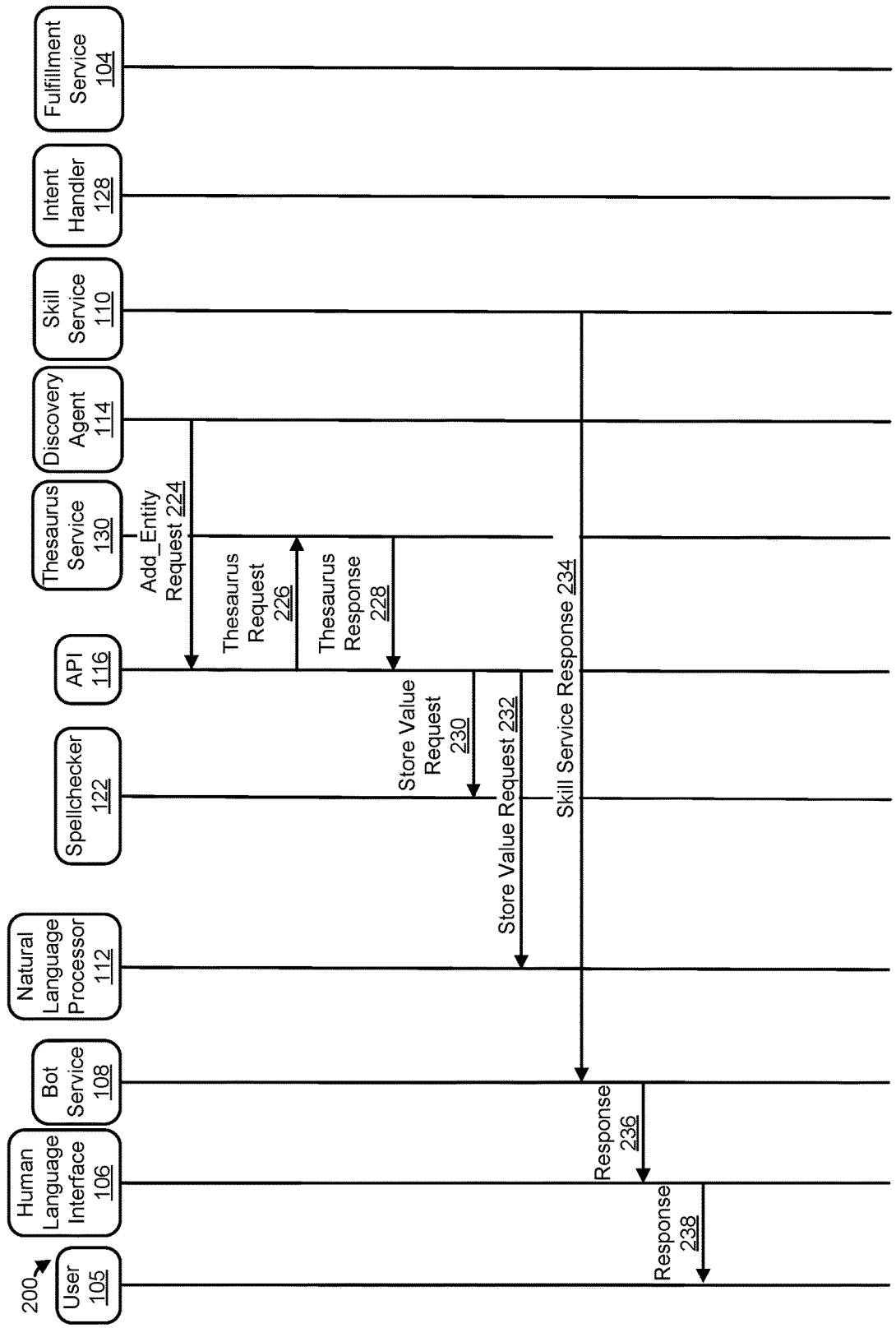

Continuing the process 200 with combined reference to FIGS. 2A and 2B, the discovery agent parses the discovery request 222 and retrieves the associations between the entities and response values specified therein. The discovery agent also generates an add_entity request 224 using the entities and response values and transmits the add_entity request 224 to an API (e.g., the API 116 of FIG. 1). In this way, the discovery agent passes entities and response values to the API for potential incorporation into an NLP system (e.g., the NLP system 112 of FIG. 1).

In some examples, the discovery agent generates and transmits the add_entity request 224 by executing a call supported by the API to add a new entity value to the language model for an existing entity. In these examples, the API call includes one or more entity parameters and one or more entity value parameters. Each of the entity parameters identifies an existing entity targeted for extension. Each of the entity value parameters identifies a potential new value for its associated existing entity. In these examples, for each association retrieved from the discovery request 222, the discovery agent includes, in the API call, an entity parameter with a value equal to an entity specified in an association and an entity value parameter with a value equal to a response value specified in the association. In this way, the discovery agent maps response values associated with an entity to potentially new entity values for the entity.

In an example directed to technical support and in which associations are stored as name-value pairs, the discovery agent can generate an API call with a parameter that matches a name-value pair included in the discovery request (e.g., "priority:[Major, Very Minor]"), although this syntactical correspondence between the discovery request 222 and the add_entity request 224 is not a requirement. For instance, the API call may require a singular entity value for each entity (e.g., "priority:Major","priority:Very Minor"). Other formulations will be apparent to those of skill in the art.

It should be noted that, in some examples, the discovery agent can limit the generation and transmission of add_entity requests 224 to include only entity values that are not present in the language model (e.g., not stored in the data stores 120 and 124 of FIG. 1). In these examples, the discovery agent determines whether each response value associated with an entity in the discovery request 222 matches an entity value associated with the entity within, for example, a cross-reference that associates entities and entity values. This cross-reference can be stored locally in memory allocated to the skill service and/or the intent handler.

Continuing the process 200, the API generates a thesaurus request 226 and transmits the thesaurus request to a thesaurus service (e.g., the thesaurus service 130 of FIG. 1). For example, the thesaurus request 226 can be an API call in the form of an HTTP request that specifies the entity value for which thesaurus data is requested. The thesaurus service receives the thesaurus request 226, looks up the thesaurus data requested therein, and generates and transmits a thesaurus response 228. The thesaurus response 228 can include the thesaurus data identified by the thesaurus service 130.

Continuing the process 200, the API receives the thesaurus response 228 and generates store value requests 230 and 232 and respectively transmits these messages to a spellchecker (e.g., the spellchecker 122 of FIG. 1) and a natural language processor (e.g., the natural language processor 118 of FIG. 1). Each of the store value requests 230 and 232 can be, for example, an API call in the form of HTTP request that specifies entity values. In response to reception of the store value request 230, the natural language processor stores the received entity values in training data of a language model data store (e.g., the language model data store 120 of FIG. 1) and retrains itself using the updated training data. In response to reception of the store value request 232, spellchecker stores the received entity values in a dictionary data store (e.g., the dictionary data store 124 of FIG. 1) utilized by the spellcheck during its operation. It should be noted that, in some examples, the store value requests 230 and 232 are transmitted directly to the language model data store and the dictionary data store for storage and utilization by the natural language processor and spellchecker. In these examples, the API or the natural language processor may initiate retraining of the natural language processor subsequent to storage of the entity values.

Continuing with the process 200, the skill service generates a skill service response 234 that is based upon and includes the handler response 220 and transmits the skill service response 234 to the bot service. The skill service response 234 can include text to render to the user. Next, the bot service generates a response 236 based on the skill service response 234 and transmits the response 236 to the human language interface. The human language interface receives the response 236 and renders a response 238 based on the response 236 to the user, and the process 200 ends. The response 238 can include, for example, a textual and/or audio rendering of the skill service response 234. As such, the rendering provided by the human language interface can include content indicating skill fulfillment success or failure, along with content representative of the response data generated by the fulfillment service as modified and/or augmented by the intent handler, skill service, bot service, and/or human language interface. After rendering of the response 236, the process 200 ends.

It should be noted that, in some examples, an external service (e.g., the fulfillment service 104) can be configured to transmit add_entity requests directly to the API 116. This approach may be advantageous during an initial configuration, system maintenance, or at another point when the conversational system is not operating in production.

Figure 3:
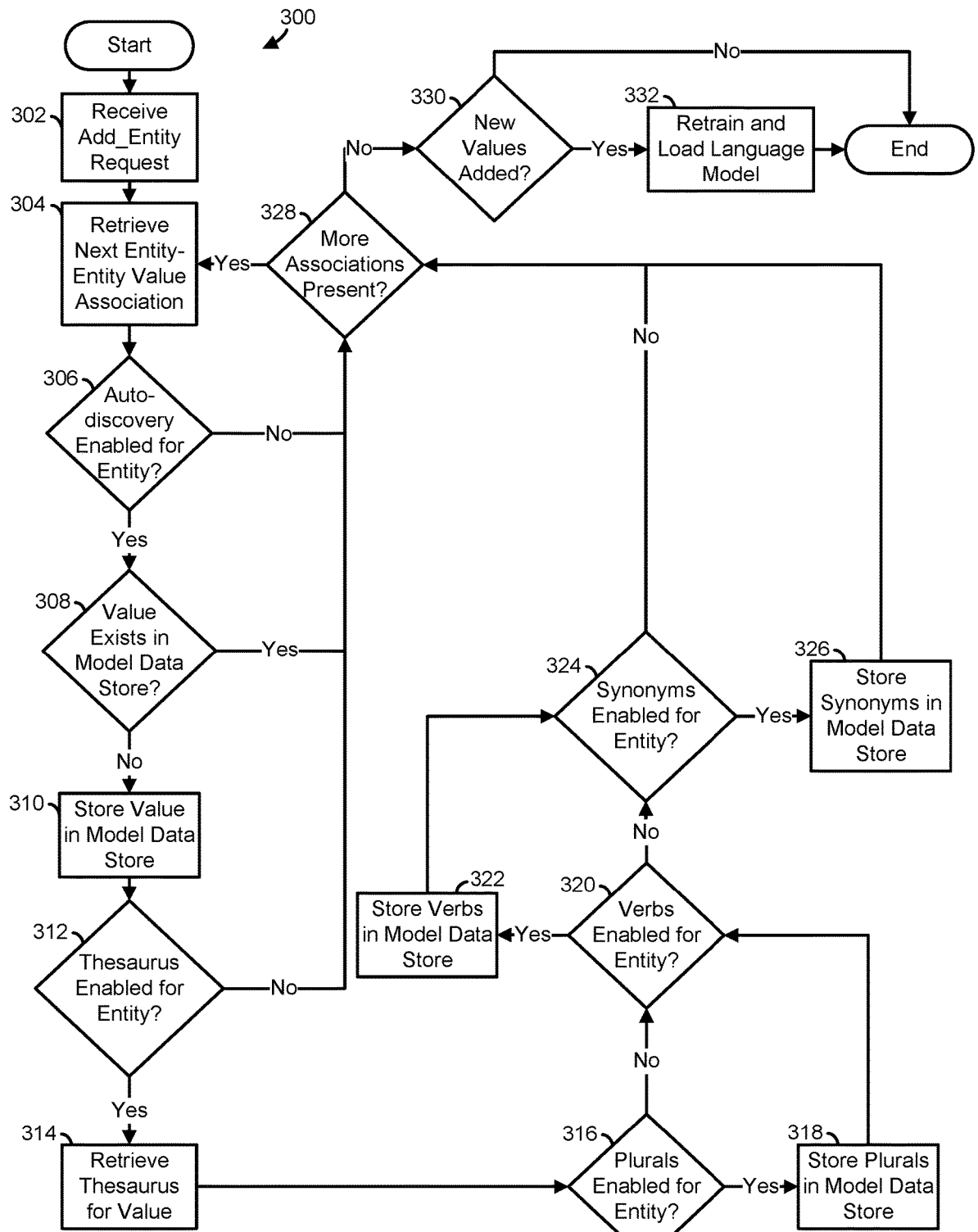
FIG. 3 is a flow diagram showing another entity learning process in accordance with one or more examples described herein.

FIG. 3 is a flow diagram that illustrates one example of a learning process 300 that an API (e.g., the API 116 of FIG. 1) is configured to execute in some examples. As shown in FIG. 3, the process 300 starts with the API receiving 302 an add_entity request (e.g., the add_entity request 224 of FIG. 2) from a discovery agent (e.g., the discovery agent 114 of FIG. 1). For instance, in one example, the add_entity request is an API call that takes the form of an HTTP request (e.g., an HTTP POST) that includes associations between entities and entity values (e.g., name-value pairs). The API parses the add_entity request and retrieves 304 the next association stored therein that has not been processed by this instance of the process 300. This next association associates an entity with an entity value for potential incorporation into the language model.

Continuing the process 300, the API determines 306 whether the API is configured to auto-discover entity values for the entity identified in the association. For example, the API can access a cross-reference that associates entities with configuration options. These configuration options can include a Boolean flag or other indicator that indicates whether the API is authorized to receive and store new entity values for the entity. Where the API determines 306 that the API is configured to auto-discover entity values for the entity, the API proceeds to operation 308. Where the API determines 306 that the API is not configured to auto-discover entity values for the entity, the API proceeds to operation 328.

In the operation 308, the API determines whether the entity value identified in the association already exists in a language model data store (e.g., the language model data store 120 of FIG. 1). For instance, the API can query the language model data store to determine whether the entity value is stored therein. Where the API determines 308 that the entity value exists in the language model data store, the API proceeds to the operation 328. Where the API determines 308 that the entity value does not exist in the language model data store, the API stores 310 the entity value in association with the entity in the language model data store. In some examples, the API interoperates directly with the language model data store to store the entity value therein. In other examples, the API interoperates with a natural language processor (e.g., the natural language processor 118 of FIG. 1) by transmitting a message (e.g., the store value request 232 of FIG. 2) to store the entity value within the language model data store.

Continuing the process 300, the API determines 312 whether the API is configured to import thesaurus data for the entity identified in the association. For example, the API can access the cross-reference that associates entities with configuration options. These configuration options can include a Boolean flag or other indicator that indicates whether the API is authorized to import thesaurus data for the entity. Where the API determines 312 that the API is configured to import thesaurus data for the entity, the API proceeds to operation 314. Where the API determines 312 that the API is configured not to import thesaurus data for the entity, the API proceeds to the operation 328.

In the operation 314, the API retrieves thesaurus data for the entity value. The thesaurus data can include, for example, pluralized versions of the entity value, verbs based on the entity value, and synonyms of the entity value. In some examples, the API retrieves the thesaurus data by interoperating with an external thesaurus service (e.g., the thesaurus service 130 of FIG. 1). These interoperations can include API calls and responses (e.g., the thesaurus request 226 and thesaurus response 228 of FIG. 2) in the form of HTTP requests and responses.

Continuing the process 300, the API determines 316 whether the entity is configured to accept plural forms of the entity value. For example, the API can access the cross-reference that associates entities with configuration options. These configuration options can include a Boolean flag or other indicator that indicates whether an associated entity is authorized to accept plural forms of entity values. Where the API determines 316 that the entity is configured to accept plural forms of entity values, the API proceeds to operation 318. Where the API determines 316 that the entity is configured not to accept plural forms of entity values, the API proceeds to operation 320.

In the operation 318, the API stores the plural forms of the entity value in association with the entity in the language model data store. In some examples, the API interoperates directly with the language model data store to store the plural forms therein. In other examples, the API interoperates with the natural language processor by transmitting a message (e.g., the store value request 232 of FIG. 2) to store the plural forms within the language model data store.

In the operation 320, the API determines whether the entity is configured to accept verb forms of the entity value. For example, the API can access the cross-reference that associates entities with configuration options. These configuration options can include a Boolean flag or other indicator that indicates whether an associated entity is authorized to accept verb forms of entity values. Where the API determines 320 that the entity is configured to accept verb forms of entity values, the API proceeds to operation 322. Where the API determines 320 that the entity is configured not to accept verb forms of entity values, the API proceeds to operation 324.

In the operation 322, the API stores the verb forms of the entity value in association with the entity in the language model data store. In some examples, the API interoperates directly with the language model data store to store the verb forms therein. In other examples, the API interoperates with the natural language processor by transmitting a message (e.g., the store value request 232 of FIG. 2) to store the verb forms within the language model data store.

In the operation 324, the API determines whether the entity is configured to accept synonyms of the entity value. For example, the API can access the cross-reference that associates entities with configuration options. These configuration options can include a Boolean flag or other indicator that indicates whether an associated entity is authorized to accept synonyms of entity values. Where the API determines 324 that the entity is configured to accept synonyms of entity values, the API proceeds to operation 326. Where the API determines 320 that the entity is configured not to accept synonyms of entity values, the API proceeds to operation 328.

In the operation 326, the API stores the synonyms of the entity value in association with the entity in the language model data store. In some examples, the API interoperates directly with the language model data store to store the synonyms therein. In other examples, the API interoperates with the natural language processor by transmitting a message (e.g., the store value request 232 of FIG. 2) to store the synonyms within the language model data store.

In operation 328, the API determines whether more unprocessed associations are present in the add_entity request. Where the API determines 328 that more unprocessed associations are present in the add_entity request, the API returns to retrieve 304 the next association. Where the API determines 328 that no more unprocessed associations are present in the add_entity request, the API proceeds to the operation 330.

In operation 330, the API determines whether newly discovered entity values were added to the language model data store as training data. For instance, the API can maintain a log of operations it executes during each instance of the process 300 and can, within this operation, refer to the log to determine whether new entity values have been added during this instance of the process 300. Where the API determines that newly discovered entity values were added to the language model data store, the API initiates 332 retraining and loading of the natural language processor, and the process 300 ends. Where the API determines 330 that no entity values were added to the language model data store, the process 300 ends.

Figure 4:
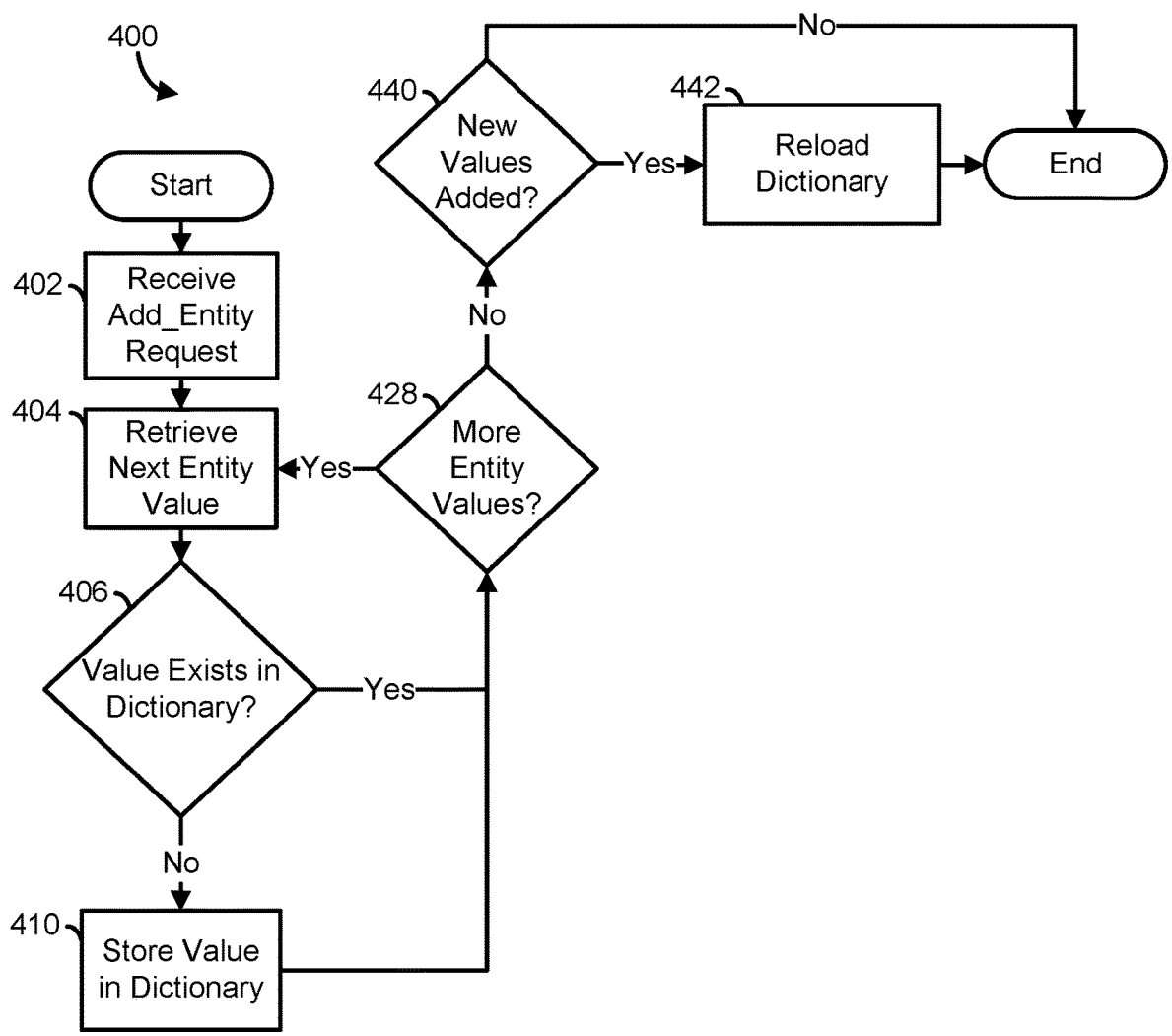
FIG. 4 is a flow diagram showing another entity learning process in accordance with one or more examples described herein.

FIG. 4 is a flow diagram that illustrates one example of another learning process 400 that an API (e.g., the API 116 of FIG. 1) is configured to execute in some examples. As shown in FIG. 4, the process 400 starts with the API receiving 402 an add_entity request (e.g., the add_entity request 224 of FIG. 2) from a discovery agent (e.g., the discovery agent 114 of FIG. 1). For instance, in one example, the add_entity request is an API call that takes the form of an HTTP request (e.g., an HTTP POST) that includes associations between entities and entity values (e.g., name-value pairs). The API parses the add_entity request and retrieves 404 the next association stored therein that has not been processed by this instance of the process 400. This next association associates an entity with an entity value for potential incorporation into the language model.

Continuing the process 400, the API determines 406 whether the entity value identified in the association already exists in a dictionary data store (e.g., the dictionary data store 124 of FIG. 1). Where the API determines 406 that the entity value exists in the dictionary data store, the API proceeds to operation 428. Where the API determines 406 that the entity value does not exist in the dictionary data store, the API stores 410 the entity value in association with the entity in the dictionary data store. In some examples, the API interoperates directly with the dictionary data store to store the entity value therein. In other examples, the API interoperates with a spellchecker (e.g., the spellchecker 122 of FIG. 1) by transmitting a message (e.g., the store value request 230 of FIG. 2) to store the entity value within the dictionary data store.

In operation 428, the API determines whether more unprocessed associations are present in the add_entity request. For instance, the API can access a list of name-value pairs stored in the add_entity request and determine whether the current association is the last member of the list. Where the API determines 428 that more unprocessed associations are present in the add_entity request, the API returns to retrieve 404 the next association. Where the API determines 428 that no more unprocessed associations are present in the add_entity request, the API proceeds to the operation 440.

In operation 440, the API determines whether newly discovered entity values were added to the dictionary data store. For instance, the API can maintain a log of operations it executes during each instance of the process 400 and can, within this operation, refer to the log to determine whether new entity values have been added during this instance of the process 400. Where the API determines that newly discovered entity values were added to the dictionary data store, the API initiates 442 reloading of the dictionary into the spellchecker, and the process 400 ends. Where the API determines 440 that no entity values were added to the dictionary data store, the process 400 ends.

It should be noted that in some examples the API can add thesaurus data into the dictionary data model by executing operations similar to the operations 312-326 described above with reference to FIG. 3.

Each of the processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Devices for Autonomous Learning Conversational Systems

Figure 5:
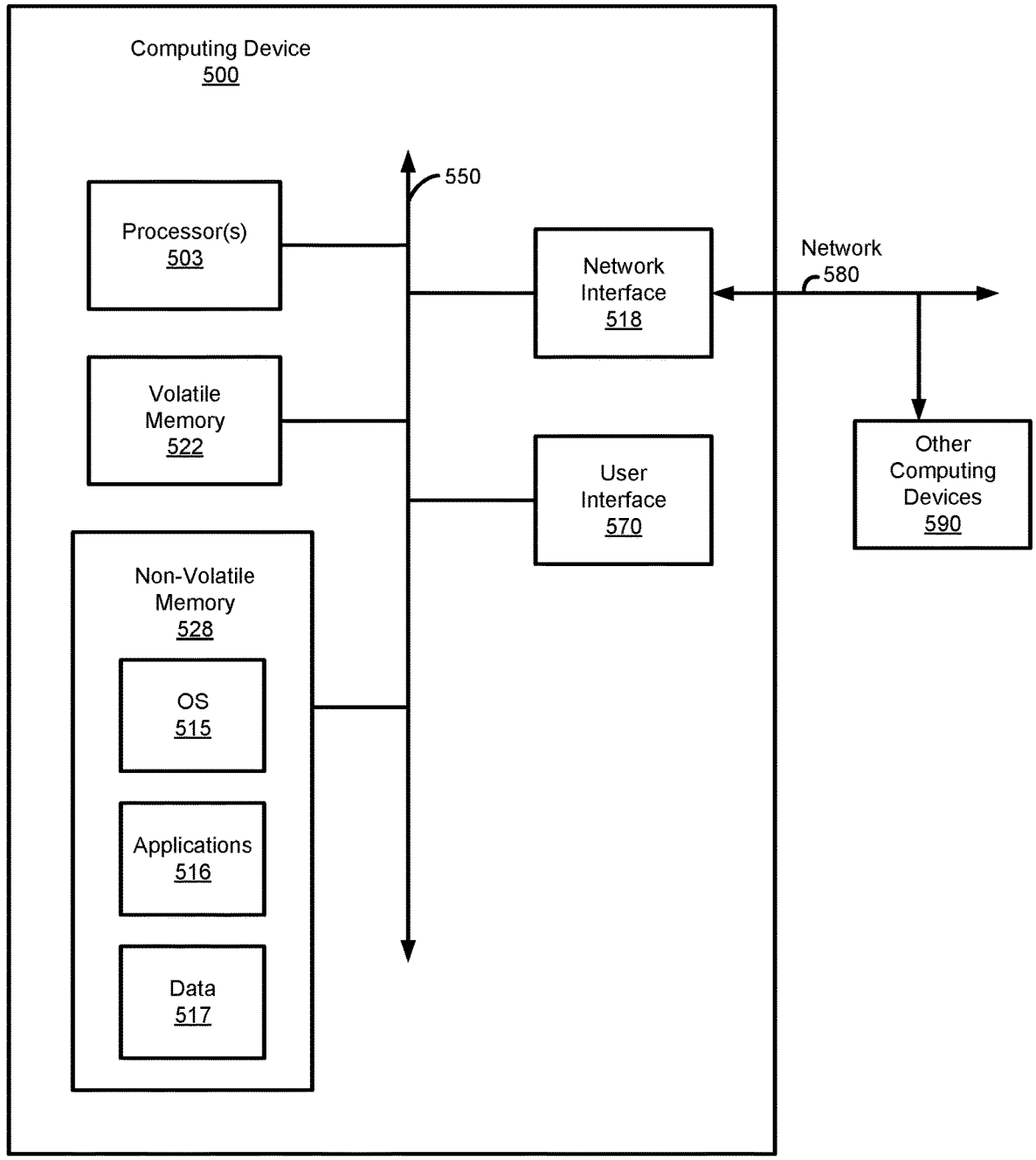
FIG. 5 is a block diagram of a network environment of computing devices in which one or more examples described herein can be implemented.

FIG. 5 is a block diagram of a computing device 500 configured to implement various autonomous learning conversational systems and processes in accordance with examples disclosed herein.

The computing device 500 includes one or more processor(s) 503, volatile memory 522 (e.g., random access memory (RAM)), non-volatile memory 528, a user interface (UI) 570, one or more network or communication interfaces 518, and a communications bus 550. The computing device 500 may also be referred to as a client device, computing device, endpoint device, computer, or a computer system.

The non-volatile (non-transitory) memory 528 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 570 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 528 stores an OS 515, one or more applications or programs 516, and data 517. The OS 515 and the application 516 include sequences of instructions that are encoded for execution by processor(s) 503. Execution of these instructions results in manipulated data. Prior to their execution, the instructions can be copied to the volatile memory 522. In some examples, the volatile memory 522 can include one or more types of RAM and/or a cache memory that can offer a faster response time than a main memory. Data can be entered through the user interface 570 or received from the other I/O device(s), such as the network interface 518. The various elements of the device 500 described above can communicate with one another via the communications bus 550.

The illustrated computing device 500 is shown merely as an example client device or server and can be implemented within any computing or processing environment with any type of physical or virtual machine or set of physical and virtual machines that can have suitable hardware and/or software capable of operating as described herein.

The processor(s) 503 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 503 can be analog, digital or mixed. In some examples, the processor(s) 503 can be one or more locally-located physical processors or one or more remotely-located physical processors. The processor(s) 503 can include multiple processor cores and/or multiple processors and can provide functionality for parallel, simultaneous execution of instructions or for parallel, simultaneous execution of one instruction on more than one piece of data.

The network interfaces 518 can include one or more interfaces to enable the computing device 500 to access a computer network 580 such as a Local Area Network (LAN), a Wide Area Network (WAN), a Personal Area Network (PAN), or the Internet through a variety of wired and/or wireless connections, including cellular connections and Bluetooth connections. In some examples, the network 580 may allow for communication with other computing devices 590, to enable distributed computing. The network 580 can include, for example, one or more private and/or public networks over which computing devices can exchange data.

In described examples, the computing device 500 can execute an application on behalf of a user of a client device. For example, the computing device 500 can execute one or more virtual machines managed by a hypervisor. Each virtual machine can provide an execution session within which applications execute on behalf of a user or a client device, such as a hosted desktop session. The computing device 500 can also execute a terminal services session to provide a hosted desktop environment. The computing device 500 can provide access to a remote computing environment including one or more applications, one or more desktop applications, and one or more desktop sessions in which one or more applications can execute.

Figure 6:
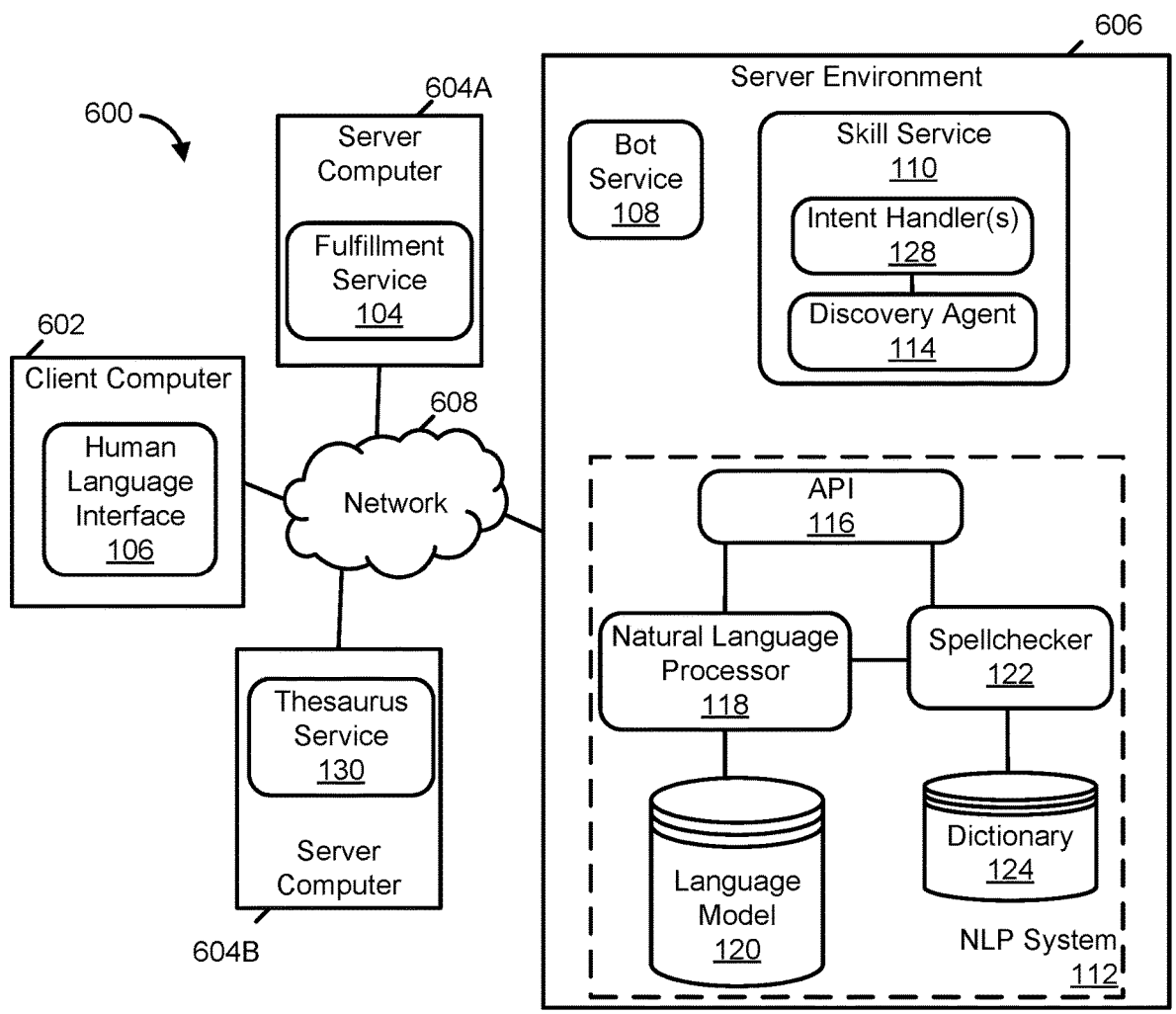
FIG. 6 is a block diagram of the virtual assistant system of FIG. 1 as implemented by a configuration of computing devices in accordance with one or more examples described herein.

FIG. 6 illustrates an autonomous learning conversational system (e.g., the conversational system 100 of FIG. 1) configured for operation within a distributed computing system 600 comprising computing devices (e.g. the computing device 500 of FIG. 5). As shown in FIG. 6, the distributed computing system 600 includes a client computer 602, server computers 604A and 604B, and a server environment 606. The client computer 602, the server computers 604A and 604B, and the server environment 606 are configured to interoperate with one another via a network 608. Each of the client computer 602, the server computers 602A and 602B, the server environment 606, and the network 608 include at least one computing device (e.g., the computing device 500 of FIG. 5). In some examples, the server environment 606 includes a plurality of computing devices structured as a cluster or other high availability, high bandwidth computing platform.

The client computer 602 is configured to host the human language interface 106 of FIG. 1. The server computer 604A is configured to host the fulfillment service 104 of FIG. 1. The server computer 604B is configured to host the thesaurus service 130 of FIG. 1. The server environment 606 is configured to host the bot service 108, the skill service 110, and the NLP system 112 of FIG. 1.

The distributed computing system 600 is but one example of many potential configurations that can be used to implement autonomous learning conversational systems. As such, the examples disclosed herein are not limited to the particular configuration of computing device and other configurations are considered to fall within the scope of this disclosure.

ADDITIONAL EXAMPLES

To further illustrate aspects and advantages of the autonomous learning conversational systems and methods described herein, two additional examples will now be described. These examples are directed to a conversational system (e.g., the conversational system 100 of FIG. 1) conversant in technical support.

In a first example, the conversational system can successfully process the following utterances: "show tickets", "show major tickets", "show Citrix tickets", and "show major tickets from Citrix". More particularly, the conversational system can recognize the "show tickets" intent, an entity value of "Citrix" for a requestor entity, and entity values of "major, minor, and critical" for a priority entity.

Continuing the first example, a user requests that the conversational system "show tickets". The conversational system fulfills the intent and responds with the following list of tickets.
{id: 1, priority: major, requestor: "company1", . . . }
{id: 2, priority: minor, requestor: "company1", . . . }
{id: 3, priority: major, requestor: "company2", . . . }
{id: 4, priority: critical, requestor: "company3", . . . }
{id: 5, priority: blocking, requestor: "Citrix", . . . }
While fulfilling the "show tickets" intent, the conversational system learns a new priority ("blocking") and new requestors ("company 1", "company 2", and "company 3").

Continuing the first example, another user subsequently requests that the conversational system "show blocking tickets". The conversational system fulfills the intent and responds with the following ticket.
{id: 5, priority: blocking, requestor: "Citrix", . . . }
It should be noted that the conversational system would be unable to respond to the subsequent request with response data derived from the "blocking" value had the conversational system not previously learned the "blocking" value for the "priority" entity.

In a second example, the NLP system of the conversational system can recognize a "cmpany" requestor, but the dictionary of the conversational system does not list "cmpany" as a correct spelling. In this example, a user requests (via a text interface) that the conversational system "show cmpany's tickets". The spellchecker of the conversational system normalizes the spelling of "cmpany" to "company", which results in the conversational system fulfilling the intent expressed in the phrase, "show company's tickets". This results in an error message as, in this example, the conversational system has no tickets for the "company" requestor.

Continuing the second process, the user requests that the conversational system "show all tickets". The conversational system fulfills the intent and responds with the following list of tickets.
{id: 1, priority: major, requestor: "company1", . . . }
{id: 2, priority: minor, requestor: "cmpany", . . . }
While fulfilling the "show tickets" intent, the conversational system learns a spelling, "cmpany".

Continuing the second process, the user again requests that the conversational system "show cmpany's tickets". In this instance, the conversational system fulfills the intent and responds with the following ticket.
{id: 2, priority: minor, requestor: "cmpany", . . . }
Thus, by learning the spelling of the "cmpany" requestor and adding it to the dictionary data store, conversational system has improved the user's experience.

Descriptions of additional examples follow. Other variations will be apparent in light of this disclosure.

Example 1 is a computer system comprising a memory storing one or more associations between one or more entities and one or more fields of response data; a network interface; and at least one processor coupled to the memory and the network interface and configured to: receive a request to process an intent; generate a request to fulfill the intent; transmit, via the network interface, the request to a fulfillment service; receive, from the fulfillment service via the network interface, response data specifying one or more values of the one or more fields; identify the one or more values of the one or more fields within the response data received from the fulfillment service; identify the one or more entities via the one or more associations using the one or more fields; store, within the memory, the one or more values of the one or more fields as one or more values of the one or more entities; and retrain a natural language processor using the one or more values of the one or more entities.

Example 2 includes the subject matter of Example 1, the at least one processor being further configured to receive, from a thesaurus service via the network interface, a response specifying thesaurus data associated with the one or more values of the one or more fields, the thesaurus data comprising one or more of a synonym, a verb, and a plural form of the one or more values of the one or more fields; and store, within the memory, the thesaurus data.

Example 3 includes the subject matter of Example 2, the at least one processor being further configured to determine, for at least one entity of the one or more entities, whether the system is configured to import thesaurus data regarding the entity.

Example 4 includes the subject matter of any of Examples 1 through 3, the at least one processor being further configured to store the one or more values of the one or more fields within dictionary data accessible by a spellchecker.

Example 5 includes the subject matter of any of Examples 1 through 4, the at least one processor being further configured to receive an utterance from a user in human language expressing the intent; identify, via execution of the natural language processor, the utterance as expressing the intent; generate a response to the intent; and render the response to the user in the human language.

Example 6 includes the subject matter of any of Examples 1 through 5, wherein the intent is a first intent and the at least one processor is further configured to receive a request to process a second intent; generate a request to fulfill the second intent, the request to fulfill the second intent including at least one parameter value equal to at least value of one or more values of the one or more fields; transmit, via the network interface, the request to the fulfillment service; and receive, via the network interface, a response to the second intent, the response to the second intent including response data derived from the parameter value.

Example 7 includes the subject matter of any of Examples 1 through 6, the at least one processor being further configured to determine, for at least one entity of the one or more entities, whether the system is configured to auto-discover values of the entity.

Example 8 is a method of autonomously learning new entity values executed by a conversational system comprising a memory storing one or more associations between one or more entities and one or more fields of response data, the method comprising receiving a request to process an intent; generating a request to fulfill the intent; transmitting, via a network interface, the request to a fulfillment service; receiving, from the fulfillment service via the network interface, response data specifying one or more values of the one or more fields; identifying the one or more values of the one or more fields within the response data received from the fulfillment service; identifying the one or more entities via the one or more associations using the one or more fields; storing, within the memory, the one or more values of the one or more fields as one or more values of the one or more entities; and retraining a natural language processor using the one or more values of the one or more entities.

Example 9 includes the subject matter of Example 8, further comprising receiving, from a thesaurus service via the network interface, a response specifying thesaurus data associated with the one or more values of the one or more fields, the thesaurus data comprising one or more of a synonym, a verb, and a plural form of the one or more values of the one or more fields; and storing, within the memory, the thesaurus data.

Example 10 includes the subject matter of Example 9, further comprising determining, for at least one entity of the one or more entities, whether the conversational system is configured to import thesaurus data regarding the entity.

Example 11 includes the subject matter of any of Examples 8 through 10, further comprising storing the one or more values of the one or more fields within dictionary data accessible by a spellchecker.

Example 12 includes the subject matter of any of Examples 8 through 11, further comprising receiving an utterance from a user in human language expressing the intent; identifying, via execution of the natural language processor, the utterance as expressing the intent; generating a response to the intent; and rendering the response to the user in the human language.

Example 13 includes the subject mater of any of Examples 8 through 12, wherein the intent is a first intent and the method further comprises receiving a request to process a second intent; generating a request to fulfill the second intent, the request to fulfill the second intent including at least one parameter value equal to at least one value of the one or more values of the one or more fields; transmitting, via the network interface, the request to the fulfillment service; and receiving, via the network interface, a response to the second intent, the response to the second intent including response data derived from the parameter value.

Example 14 includes the subject matter of any of Examples 8 through 13, further comprising determining, for at least one entity of the one or more entities, whether the conversational system is configured to auto-discover values of the entity.

Example 15 is a non-transitory computer readable medium storing executable sequences of instructions to implement an autonomous learning process within a conversational system comprising a memory storing one or more associations between one or more entities and one or more fields of response data, the sequences of instructions comprising instructions to: receive a request to process an intent; generate a request to fulfill the intent; transmit, via a network interface, the request to a fulfillment service; receive, from the fulfillment service via the network interface, response data specifying one or more values of the one or more fields; identify the one or more values of the one or more fields within the response data received from the fulfillment service; identify the one or more entities via the one or more associations using the one or more fields; store, within the memory, the one or more values of the one or more fields as one or more values of the one or more entities; and retrain a natural language processor using the one or more values of the one or more entities.

Example 16 includes the subject matter of Example 15, the sequences of instructions further comprising instructions to receive, from a thesaurus service via the network interface, a response specifying thesaurus data associated with the one or more values of the one or more fields, the thesaurus data comprising one or more of a synonym, a verb, and a plural form of the one or more values of the one or more fields; and store, within the memory, the thesaurus data.

Example 17 includes the subject matter of Example 16, the sequences of instructions further comprising instructions to determine, for at least one entity of the one or more entities, whether the conversational system is configured to import thesaurus data regarding the entity.

Example 18 includes the subject matter of any of Examples 15 through 17, the sequences of instructions further comprising instructions to store the one or more values of the one or more fields within dictionary data accessible by a spellchecker.

Example 19 includes the subject matter of any of Examples 15 through 18, wherein the intent is a first intent, the sequences of instructions further comprising instructions to receive a request to process a second intent; generate a request to fulfill the second intent including at least one parameter value equal to at least one value of the one or more values of the one or more fields; transmit, via the network interface, the request to the fulfillment service; and receive, via the network interface, a response to the second intent including response data derived from the parameter value.

Example 20 includes the subject matter of any of Examples 15 through 19, the sequences of instructions further comprising instructions to determine, for at least one entity of the one or more entities, whether the conversational system is configured to auto-discover values of the entity.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
    a memory storing one or more associations between one or more entities and one or more fields of response data;
    a network interface; and
    at least one processor coupled to the memory and the network interface and configured to:
        receive a skill service request to process an intent, the skill service request specifying at least one entity having an entity value;
        generate a fulfillment request to fulfill the intent, the fulfillment request including the entity value;
        transmit, via the network interface, the fulfillment request to a fulfillment service that is configured to execute a programmatic action to fulfill the intent using the entity value;
        receive, from the fulfillment service via the network interface, fulfillment response data specifying one or more response values of the one or more fields, the fulfillment response data further including an indicator of whether the fulfillment service successfully executed the programmatic action to fulfill the intent;
        identify the one or more entities corresponding to the one or more fields within the fulfillment response data using the one or more associations between the one or more entities and the one or more fields of response data stored in the memory;
        store, within the memory, the one or more response values of the one or more fields as one or more new entity values of the one or more entities; and
        retrain a natural language processor using the one or more new entity values of the one or more entities for processing a further intent.

2. The computer system of claim 1, the at least one processor being further configured to:
    receive, from a thesaurus service via the network interface, a response specifying thesaurus data associated with the one or more response values of the one or more fields, the thesaurus data comprising one or more of a synonym, a verb, and a plural form of the one or more values of the one or more fields; and
    store, within the memory, the thesaurus data.

3. The computer system of claim 2, the at least one processor being further configured to determine, for at least one entity of the one or more entities, whether the system is configured to import thesaurus data regarding the entity.

4. The computer system of claim 1, the at least one processor being further configured to store the one or more response values of the one or more fields within dictionary data accessible by a spellchecker.

5. The computer system of claim 1, the at least one processor being further configured to:
    receive an utterance from a user in human language expressing the intent;
    identify, via execution of the natural language processor, the utterance as expressing the intent;
    generate a response to the intent; and
    render the response to the user in the human language.

6. The computer system of claim 1, wherein the intent is a first intent, the at least one processor being further configured to:
receive a request to process a second intent;
generate a fulfillment request to fulfill the second intent, the fulfillment request to fulfill the second intent including at least one parameter value equal to at least one value of the one or more values of the one or more fields;
transmit, via the network interface, the fulfillment request to fulfil the second intent to the fulfillment service; and
receive, via the network interface, a fulfillment response to the second intent, the fulfillment response to the second intent including fulfillment response data derived from the parameter value.

7. The computer system of claim 1, the at least one processor being further configured to determine, for at least one entity of the one or more entities, whether the system is configured to auto-discover values of the entity.

8. A method of autonomously learning new entity values executed by a conversational system comprising a memory storing one or more associations between one or more entities and one or more fields of response data, the method comprising:
receiving a skill service request to process an intent, the skill service request specifying at least one entity having an entity value;
generating a fulfillment request to fulfill the intent, the fulfillment request including the entity value;
transmitting, via a network interface, the fulfillment request to a fulfillment service that is configured to execute a programmatic action to fulfill the intent using the entity value;
receiving, from the fulfillment service via the network interface, fulfillment response data specifying one or more response values of the one or more fields, the fulfillment response data further including an indicator of whether the fulfillment service successfully executed the programmatic action to fulfill the intent;
identifying the one or more entities corresponding to the one or more fields within the fulfillment response data using the one or more associations between the one or more entities and the one or more fields of response data stored in the memory;
storing, within the memory, the one or more response values of the one or more fields as one or more new entity values of the one or more entities; and
retraining a natural language processor using the one or more new entity values of the one or more entities for processing a further intent.

9. The method of claim 8, further comprising:
receiving, from a thesaurus service via the network interface, a response specifying thesaurus data associated with the one or more response values of the one or more fields, the thesaurus data comprising one or more of a synonym, a verb, and a plural form of the one or more values of the one or more fields; and
storing, within the memory, the thesaurus data.

10. The method of claim 9, further comprising determining, for at least one entity of the one or more entities, whether the conversational system is configured to import thesaurus data regarding the entity.

11. The method of claim 8, further comprising storing the one or more response values of the one or more fields within dictionary data accessible by a spellchecker.

12. The method of claim 8, further comprising:
receiving an utterance from a user in human language expressing the intent;
identifying, via execution of the natural language processor, the utterance as expressing the intent;
generating a response to the intent; and
rendering the response to the user in the human language.

13. The method of claim 8, wherein the intent is a first intent, the method further comprising:
receiving a request to process a second intent;
generating a fulfillment request to fulfill the second intent, the fulfillment request to fulfill the second intent including at least one parameter value equal to at least one value of the one or more values of the one or more fields;
transmitting, via the network interface, the fulfillment request to fulfil the second intent to the fulfillment service; and
receiving, via the network interface, a fulfillment response to the second intent, the fulfillment response to the second intent including fulfillment response data derived from the parameter value.

14. The method of claim 8, further comprising determining, for at least one entity of the one or more entities, whether the conversational system is configured to auto-discover values of the entity.

15. A non-transitory computer readable medium storing executable sequences of instructions to implement an autonomous learning process within a conversational system comprising a memory storing one or more associations between one or more entities and one or more fields of response data, the sequences of instructions comprising instructions to:
receive a skill service request to process an intent, the skill service request specifying at least one entity having an entity value;
generate a fulfillment request to fulfill the intent, the fulfillment request including the entity value;
transmit, via the network interface, the fulfillment request to a fulfillment service that is configured to execute a programmatic action to fulfill the intent using the entity value;
receive, from the fulfillment service via the network interface, fulfillment response data specifying one or more response values of the one or more fields, the fulfillment response data further including an indicator of whether the fulfillment service successfully executed the programmatic action to fulfill the intent;
identify the one or more entities corresponding to the one or more fields within the fulfillment response data using the one or more associations between the one or more entities and the one or more fields of response data stored in the memory;
store, within the memory, the one or more response values of the one or more fields as one or more new entity values of the one or more entities; and
retrain a natural language processor using the one or more new entity values of the one or more entities for processing a further intent.

16. The non-transitory computer readable medium of claim 15, the sequences of instructions further comprising instructions to:
receive, from a thesaurus service via the network interface, a response specifying thesaurus data associated with the one or more response values of the one or more fields, the thesaurus data comprising one or more of a synonym, a verb, and a plural form of the one or more values of the one or more fields; and store, within the memory, the thesaurus data.

17. The non-transitory computer readable medium of claim 16, the sequences of instructions further comprising instructions to determine, for at least one entity of the one or more entities, whether the conversational system is configured to import thesaurus data regarding the entity.

18. The non-transitory computer readable medium of claim 15, the sequences of instructions further comprising instructions to store the one or more response values of the one or more fields within dictionary data accessible by a spellchecker.

19. The non-transitory computer readable medium of claim 15, wherein the intent is a first intent, the sequences of instructions further comprising instructions to:

receive a request to process a second intent;

generate a fulfillment request to fulfill the second intent including at least one parameter value equal to at least one value of the one or more values of the one or more fields;

transmit, via the network interface, the fulfillment request to fulfil the second intent to the fulfillment service; and receive, via the network interface, a fulfillment response to the second intent including fulfillment response data derived from the parameter value.

20. The non-transitory computer readable medium of claim 15, the sequences of instructions further comprising instructions to determine, for at least one entity of the one or more entities, whether the conversational system is configured to auto-discover values of the entity.

* * * * *